United States Patent [19]

Timms

[11] 4,059,472

[45] Nov. 22, 1977

[54] COATED PRODUCTS

[75] Inventor: Ralph G. Timms, Wirral, England

[73] Assignee: British Steel Corporation, London, England

[21] Appl. No.: 677,867

[22] Filed: Apr. 19, 1976

[30] Foreign Application Priority Data

Apr. 30, 1975 United Kingdom ............... 18018/75

[51] Int. Cl.² ......................... B32B 31/00; B26D 5/00; B26D 5/38
[52] U.S. Cl. ..................................... 156/259; 83/370; 156/353; 156/517
[58] Field of Search ............... 156/259, 260, 267, 353, 156/5, 269-271, 517, 510; 83/370; 53/64

[56] References Cited

U.S. PATENT DOCUMENTS

| 3,340,124 | 9/1967 | Lowe et al. | 156/259 |
| 3,383,268 | 5/1968 | Wethington | 156/517 |

Primary Examiner—Douglas J. Drummond
Attorney, Agent, or Firm—Bacon & Thomas

[57] ABSTRACT

A method for producing coated strip by continuously applying a film of the coating to the moving strip comprises trimming at least one edge of the film before it makes contact with the strip by a stationary or moving cutter which is responsive to the position of the adjacent strip edge. Both edges of the strip may be trimmed by separate cutters which can be coupled so as to be simultaneously responsive to the position of one edge of the strip only. Alternatively the cutters may operate independently on both edges of the film, with each cutter being responsive to the respective strip edge. The cutter or cutters may be secured to a pivoted arm which carries a shoe arranged to engage the corresponding strip edge so that the cutter moves in unison with this edge.

20 Claims, 3 Drawing Figures

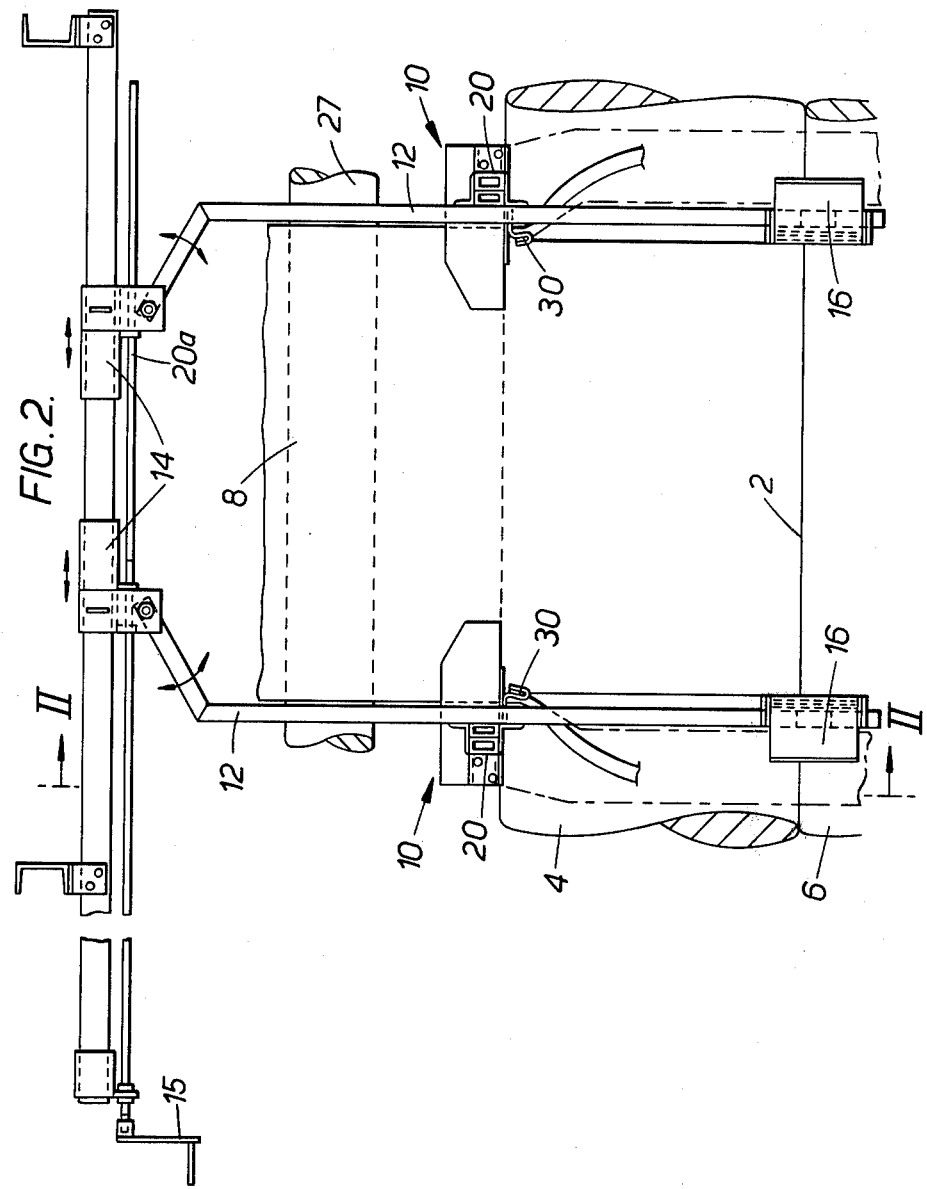

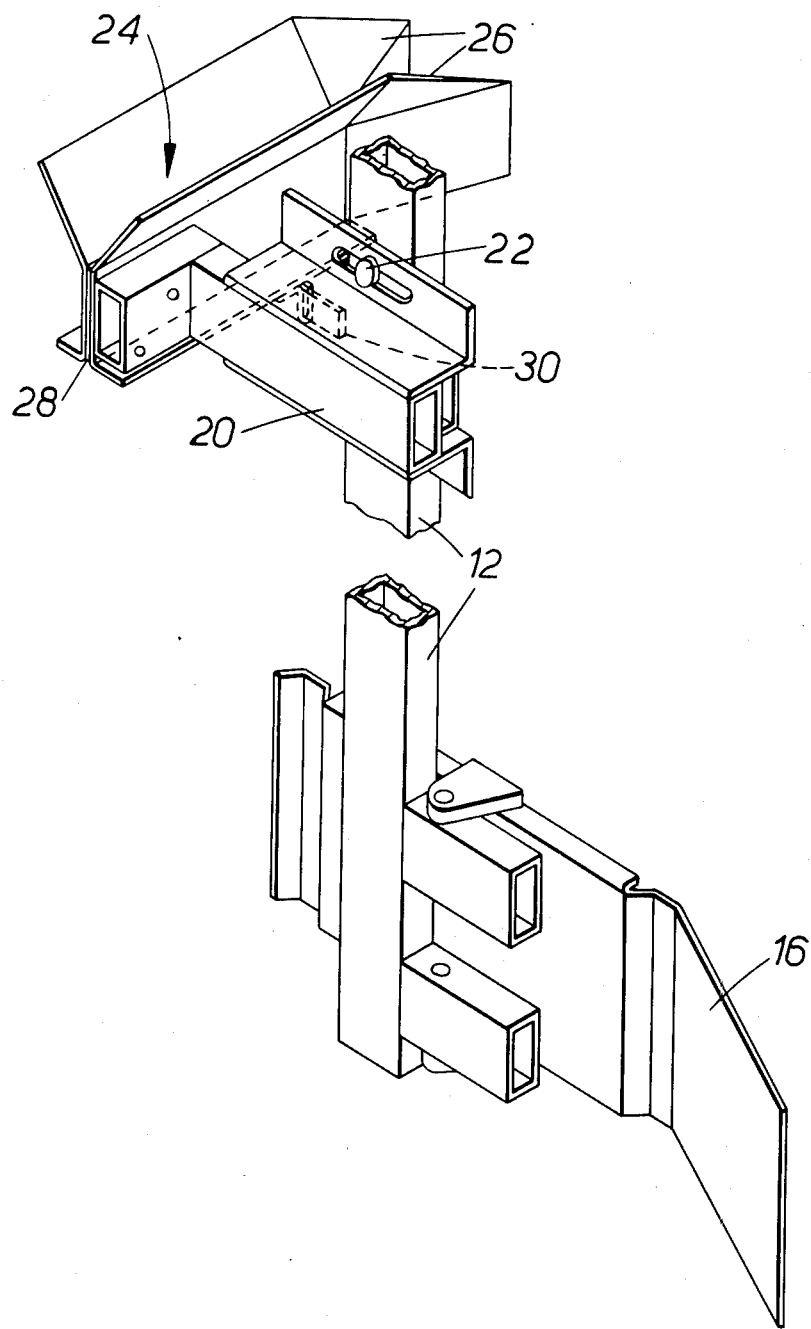

COATED PRODUCTS

This invention relates to the production of coated sheet or strip. It is concerned with the production of a coated sheet or strip produced continuously by applying the coating as a film to at least one surface of moving sheet or strip in a manner effective to produce a bond at the interface.

The present invention is particularly, though not exclusively concerned with the production of steel strip coated with a layer of plastics material which optionally is provided with a decorative finish or pattern. In one conventional process for producing such a coated product, moving steel strip is adhesively treated and is subsequently presented with a similarly moving film of plastics material which is then bonded to its steel substrate by, for example, pressure applied at the nip between two rolls.

In such a process, the width of the plastics film is, ideally, matched to that of the steel strip to avoid wastage of material produced by overlap. In practice, however, considerable difficulty occurs in maintaining accurate register between the steel substrate and the applied plastics film due to lateral wander in either the film or the strip or both. On a production line, this difficulty may be overcome by increasing the width of the plastics film by an amount greater than any aggregate lateral drift which is likely to be encountered and subsequently trimming the overlap after the bonding operation.

This technique suffers from a considerable cost disadvantage arising both from the wastage of trimmed material as well as from the cost of a trimming operation applied to a rigid steel or other substrate. It is moreover not applicable to producing strip in which the coating is required to terminate short of the strip edge in order to produce an electrically conducting surface capable of being used for a spot or other welding operation.

According to its broadest aspect, the present invention provides in a method for producing coated strip by continuously applying a film of the coating to the moving strip, trimming at least one edge of the film before it makes contact with the strip by means which are responsive to the position of the adjacent strip edge.

By the use of the invention, the trimming means, which may comprise a stationary or a moving cutter, maintain the edge of the film, substantially in register with the edge or other selected datum on the strip independently of any lateral wander which may occur. In most cases, both edges of the film are trimmed by separate cutters which may optionally be coupled so as to be simultaneously responsive to the position of one edge of the strip only. Alternatively, however, the cutters may operate independently on both edges of the film, with each cutter being responsive to the respective strip edge.

Conveniently, the cutter or other trimming means is suitably secured to a pivoted arm which carries a shoe arranged to engage the corresponding strip edge so that the cutter moves in unison with this edge.

An embodiment of the invention will now be particularly described by way of the example with reference to the accompanying drawings in which, FIG. 1 is a side view of apparatus for coating steel strip with a film of plastics material.

FIG. 2 is a top elevation of the apparatus of FIG. 1; and

FIG. 3 shows a perspective view respectively of the cutting blade assembly and shoe assembly of the apparatus of FIGS. 1 and 2.

Figure 1:
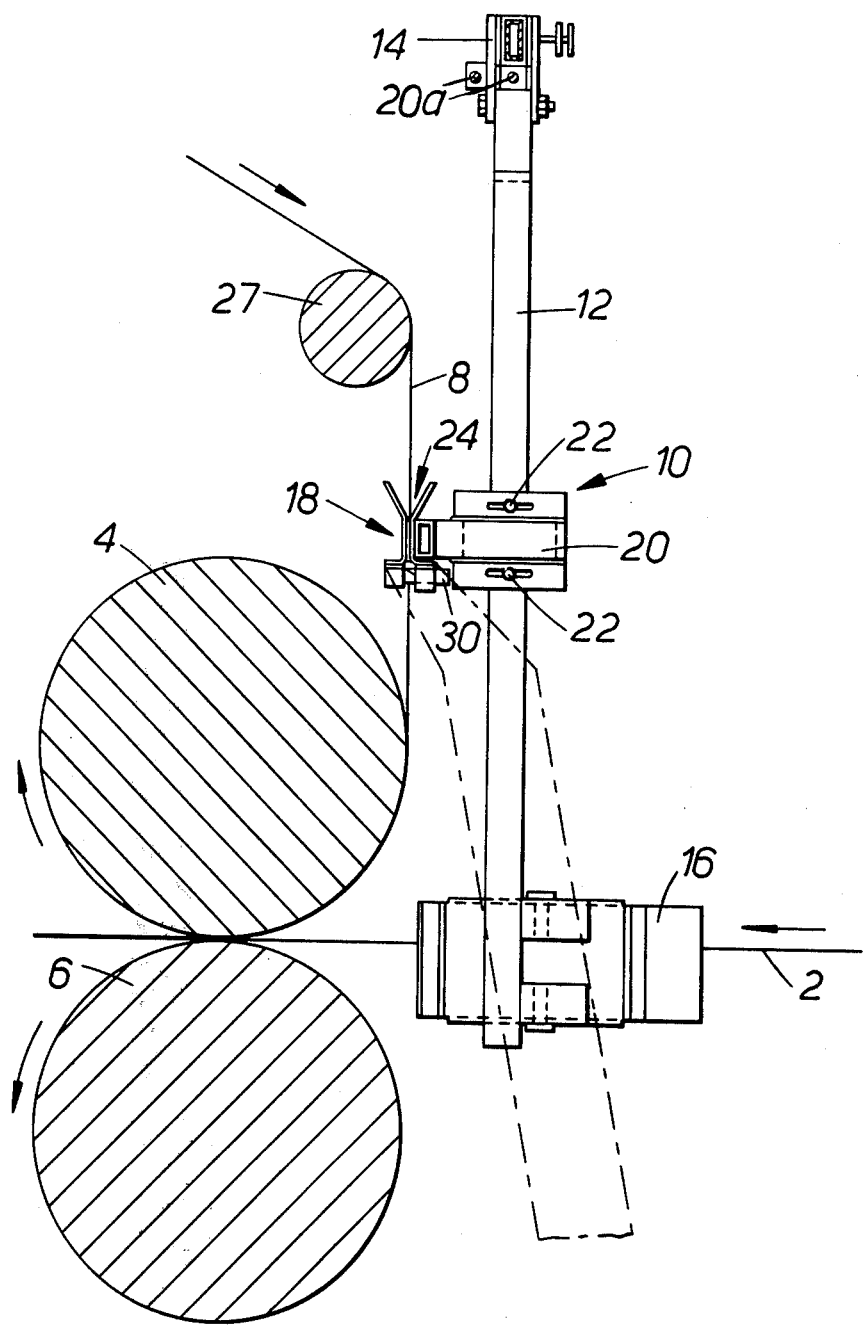

Referring to the drawings, FIGS. 1 and 2 illustrate a station of a continuous line for coating steel strip with a protective and decorative layer consisting of polyvinylchloride PVC or other plastics material applied in the form of a film or like sheet material.

At this station, moving steel strip 2 derived from an upstream uncoiler (not shown) and provided on one surface with a layer of adhesive such as butyl rubber is fed into the nip between two rolls 4, 6 concurrently with a film of plastics material in the form of strip 8. The pressure applied by the rolls 4, 6 at the nip is such as to produce a bond between the film and the steel strip. After bonding at the nip the coated strip 2 passes to a suitable coiler or guillotine in a manner well known in the art.

To ensure accurate and constant register between the strip 2 and the film 8 immediately prior to bonding, the trimming arrangement indicated generally at 10 is provided to cut each edge of the film 8 so that it is maintained either coincident with the corresponding edge of the strip 2 or consistently spaced therefrom by a selected distance.

As illustrated the trimming arrangement 10 comprises, for each of the edges, a rigid vertical arm 12 which is pivotally mounted at its upper end of carriage 14. Carriage 14 is capable of being positioned relatively to the strip edge by a cranked handle 15 operating a lead 20a screw engaging a threaded portion of the carriage so that the arm 12 can swing vertically irrespective of the width of strip being coated.

Supported pivotally at the lower end of each arm 12 is a shoe 16 which can be urged into contact with the adjacent edge of strip 2 by the weight of the arm 12 acting about its pivot mounting. The arm as a whole accordingly moves in response to any lateral drift in the position of the strip edge and therefore in the strip itself. As shown more clearly in FIG. 3, the shoe 16 has a rectilineal portion of substantial length to ensure that it responds to overall changes in strip edge position rather than transient changes such as those produced by roughness or defects.

Mounted on each arm 12 above shoe 16 is a cutter assembly indicated generally at 18. As shown more particularly in FIG. 3, assembly 18 comprises a slotted bearer 20 capable of being set relatively to the adjacent edge of film 8 by way of the adjuster 22. Mounted on bearer 20 is a film guide 24 comprising plates 26 forming a mouth for receiving incoming film from a guide roller 27 and converging to a channel 28 dimensioned to permit free running of the film while restraining any substantial play.

Downstream of channel 28, is a stationary blade 30 effective to engage the adjacent edge of film 8 at a lateral position determined by the angular position of arm 12 and thereby to the edge of strip 2 as sensed by the engaging shoe 16. Lateral wander of either edge of strip 2 will accordingly produce correcting movement of the respective blade 30 so that each edge of the film offered to the strip at the nip between rolls 4, 6 will be in the selected register with the strip edge.

In use, arms 12 are adjusted by way of handle 15 so that the blades 30 are in a selected position with each shoe 16 bearing on the respective strip edge. The adjustment may be with the edges of film 8 coincident with those of strip 2 or displaced inboard of the edges to leave an area suitable for welding.

It will be appreciated that while the blades 30 have been described as mechanically coupled to sensor shoe 16 any suitable form of coupling such as hydraulic or electrical coupling may be employed. Also while stationary blades have been shown and described, single or co-operating pairs of reciprocating or rotary blades may be used in the manner well known in the art.

It will also be appreciated that while the invention has been described with reference to the production of vinyl coated steel, it is equally acceptable to any coating, for example, metal foils applied to a metal or other substrate.

We claim:

1. A method for producing coated strip by continuously applying a film of the coating to the moving strip and trimming at least one edge of the film before it makes contact with the strip by means which are responsive to the position of the adjacent strip edge.

2. A method as claimed in claim 1 wherein the trimming means comprises a cutter which is stationary or which moves relatively to its support.

3. A method as claimed in claim 2 wherein the cutter comprises a stationary or moving blade.

4. A method as claimed in claim 1 wherein the trimming means move in response to a member which mechanically engages the edge of the strip.

5. A method as claimed in claim 4 wherein the trimming means are mechanically coupled to the engaging member.

6. A method as claimed in claim 4 wherein the trimming means are hydraulically or electrically coupled to the engaging member.

7. A method as claimed in claim 5 wherein the engaging member comprises a shoe mounted upon a pivoted arm which carries the trimming means.

8. A method as claimed in claim 7 wherein the pivoted lever is arranged to gravitationally urge the shoe against the adjacent edge of the strip.

9. A method as claimed in claim 1 wherein cutter means are arranged to trim both of the opposed edges of the film.

10. A method as claimed in claim 9 wherein the two trimming means operate independently in response to their respective edges of the strip or operate in unison in response to one edge only of the strip.

11. A method as claimed in claim 1 wherein the position of any trimming means can be adjusted independently in relation to an edge of the strip.

12. In apparatus for continuously producing coated strip or sheet with a film of coating material, wherein the strip or sheet and the film of coating material are continuously moving and are brought into contact with each other to produce the coated strip or sheet, the improvement comprising: means for trimming at least one side of said film before it makes contact with said strip or sheet, means mounting the trimming means for movement transversely of said film, and means responsive to changes in the position of said one side of said strip or sheet before the film is brought into contact with the strip or sheet for moving said trimming means transversely of said film and in the direction of the changes in position of the one side of the strip or sheet.

13. Apparatus as claimed in claim 12 wherein the means responsive to the change in position of said one side of said strip or sheet comprises a member connected with the means for mounting the trimming means and engageable with said one edge of said strip or sheet.

14. Apparatus as claimed in claim 12 wherein said trimming means is adjustably mounted on the mounting means.

15. Apparatus as claimed in claim 12 wherein the means for mounting the trimming means comprises an arm pivotally mounted to a support.

16. Apparatus as claimed in claim 12 including means at the pivotally mounted end of the arm for adjusting the arm transversely of said film.

17. Apparatus as claimed in claim 16 wherein said member is connected at one end of said arm, and said pivotally mounted end is at the opposite end of said arm.

18. Apparatus as claimed in claim 17 wherein said arm is suspended from its pivoted end and said member is a shoe engageable with said one edge of said strip or sheet.

19. Apparatus as claimed in claim 18 including a second arm pivotally mounted to said support, second trimming means mounted on said second arm and a second member engageable with the other side of the strip or sheet and movable in the direction of changes in the position of the other side of the strip or sheet for trimming the other side of said film before it makes contact with said strip or sheet.

20. Apparatus as claimed in claim 19 including means for adjusting said second arm and said second trimming means transversely of said film.

* * * * *